United States Patent [19]

Maier

[11] Patent Number: 4,565,515

[45] Date of Patent: Jan. 21, 1986

[54] NOZZLE ASSEMBLY FOR EXTRUDING A SYNTHETIC-RESIN TUBE

[75] Inventor: Rudolf Maier, Lohmar, Fed. Rep. of Germany

[73] Assignee: Battenfeld Fischer Blasformtechnik GmbH, Lohmar, Fed. Rep. of Germany

[21] Appl. No.: 580,467

[22] Filed: Feb. 15, 1984

[30] Foreign Application Priority Data

Feb. 16, 1983 [DE] Fed. Rep. of Germany ....... 3305242

[51] Int. Cl.$^4$ ............................................. B29F 3/02
[52] U.S. Cl. .................................. 425/381; 425/380; 425/462; 425/466; 425/467
[58] Field of Search ............... 425/380, 381, 461, 462, 425/464, 465, 467, 131.1, 133.1, 532; 264/209.8, 171–173, 515, 541

[56] References Cited

U.S. PATENT DOCUMENTS

| | | | |
|---|---|---|---|
| 2,688,154 | 9/1954 | Huckfeldt | 264/209.8 |
| 3,666,390 | 5/1972 | Gerow | 425/380 |
| 3,801,254 | 4/1974 | Godtner | 425/380 |
| 4,063,865 | 12/1977 | Becker | 425/467 |
| 4,323,339 | 4/1982 | de Kok et al. | 264/209.8 |
| 4,382,766 | 5/1983 | Feuerherm | 425/466 |
| 4,395,217 | 7/1983 | Benadi425 | 382 R/ |

FOREIGN PATENT DOCUMENTS 3031333  3/1982  Fed. Rep. of Germany ... 264/209.8

*Primary Examiner*—Caleb Weston
*Assistant Examiner*—J. Fortenberry
*Attorney, Agent, or Firm*—Karl F. Ross; Herbert Dubno

[57] ABSTRACT

A nozzle assembly for extruding a tube has an outer housing sleeve having an inner surface centered on an axis and having an axially forwardly directed front end and a core formed of attached-together front, intermediate, and rear core ports. The front core part lies within the sleeve at the front end thereof and forms with the inner housing surface an annular axially forwardly open extrusion passage. The intermediate core part lies within the sleeve axially behind the front core part and is formed with a pair of grooves opening radially outward into the passage and each defined by a respective annular rear face extending generally perpendicular to the axis, a respective annular front face confronting the rear face and extending generally perpendicular to the axis, and a heart-shaped annular surface axially bridging the respective faces, facing radially forward, and having a portion forming a radially forwardly directed point. The rear core part lies within the sleeve axially behind the intermediate core part and axially rearwardly closes the passage. At least one feed passage in the rear and intermediate core parts serves for feeding a mass to be extruded under pressure to the grooves at locations therein generally diametrally opposite the respective points. Each of the grooves has its region of greatest radial depth at the respective location and the feed passage opens radially into the grooves.

18 Claims, 7 Drawing Figures

NOZZLE ASSEMBLY FOR EXTRUDING A SYNTHETIC-RESIN TUBE

FIELD OF THE INVENTION

The present invention relates to the extrusion of a synthetic-resin tube. More particularly this invention concerns a nozzle assembly for making such a tube.

BACKGROUND OF THE INVENTION

A standard nozzle assembly for making a synthetic-resin tube has an outer housing sleeve having an inner surface centered on an axis and having an axially forwardly directed front end. A core within the sleeve forms with the inner housing surface an annular axially forwardly open extrusion passage. An extruder feeds a mass to be extruded under pressure to the rear end of this extrusion passage so that it emerges either continuously or discontinuously from the front passage end as a tube.

As described in German patent document No. 1,753,883 filed Mar. 18, 1968 by H. Feuerherm, this core is held in place by short radial struts that extend between it and the outer housing sleeve. Thus the annular axially forward flow of the mass being extruded is interrupted by these struts.

Such division of the flow is usually visible as lines or striations in the finished tube. Bubbles can form where the flow reunites downstream of the support struts, weakening and even forming holes in the product which is almost invariably supposed to be gas- and liquid-impervious. As the molecular weight of the resin being extruded increases, the problems similarly increase.

OBJECTS OF THE INVENTION

It is therefore an object of the present invention to provide an improved nozzle assembly for extruding a synthetic-resin tube.

Another object is the provision of such a nozzle assembly for extruding a synthetic-resin tube which overcomes the above-given disadvantages, that is which avoids the formation of the above-described divisions in the tube produced.

SUMMARY OF THE INVENTION

A nozzle assembly for extruding a tube according to the invention has an outer housing sleeve having an inner surface centered on an axis and having an axially forwardly directed front end and a core formed of attached-together front, intermediate, and rear core ports. The front core part lies within the sleeve at the front end thereof and forms with the inner housing surface an annular axially forwardly open extrusion passage. The intermediate core part lies within the sleeve axially behind the front core part and is formed with a pair of radially outwardly open grooves opening into the passage and each defined by a respective annular rear face extending generally perpendicular to the axis, a respective annular front face confronting the rear face and extending generally perpendicular to the axis, and a heart-shaped annular surface axially bridging the respective faces, facing radially forward, and having a portion forming a radially forwardly directed point. The rear core part lies within the sleeve axially behind the intermediate core part and axially rearwardly closes the passage. At least one feed passage in the rear and intermediate core parts serves for feeding a mass to be extruded under pressure to the grooves at locations therein generally diametrally opposite the respective points. In addition each of the grooves has its region of greatest radial depth at the respective location and the feed passage opens radially into the grooves.

With this system, therefore, the use of struts is wholly eliminated. At least two annular flows will be united to form an almost perfectly uniform product. Each of the flows itself will be annularly almost completely intact, so that when they join no seams will be created.

According to another feature of this invention the assembly has respective forwardly flared skirts extending axially forward from the core parts from immediately axially behind the rear groove faces and forming flared passage extensions extending from the respective grooves to the extrusion passage. Of course it is within the scope of this invention for more than two such grooves and relates structure to be provided for even better mixing of the streams and an even more uniform product.

There is one such feed passage generally centered on the axis and opening radially into both of the locations. This type of operation allows the minimum and maximum path lengths that the resin will have to follow to get from the feed passage to the extrusion passage to vary lie between a ration of 1:2 and 1:4. Thus the residence time inside the nozzle assembly for the resin does not vary greatly, eliminating some deleterious effects on the elasticity and other properties of the finished product.

This feed passage can be provided between the grooves with a restriction. In addition it is possible to employ respective separate feed passages extending generally axially open into the grooves at the respective locations, and each provided with a respective restriction.

The points of the heart-shaped groove surfaces are angularly offset and in fact are, according to this invention, angularly generally equispaced about the axis. Thus when two grooves are used they are offset by 180°.

In accordance with another feature of the invention the groove surfaces are generally symmetrical about respective planes including the axis and bisecting the respective points and locations and the assembly further has respective flow-directing bodies in the grooves, between the respective faces, at the respective locations, and on the respective symmetry planes. Each of the flow-directing bodies is formed as a blade pivotal about a respective axis parallel to the housing axis and is doubly tapered with opposite sharp ends so as to be rhombus- or boat-shaped. They thus can be positioned to be bisected by the respective symmetry planes. In addition each of the bodies projects from one of the respective groove faces and is axially spaced from the other respective groove face. Thus the bodies to not completely subdivide the flow around them, reducing the likelihood of any resultant weakening of the tube produced according to this invention.

The feed passage of this invention has a flow restriction at least at the locations. These restrictions are formed by respective flow-restricting bodies each secured to one of the faces of the grooves.

The assembly of the present invention also has a forwardly flared skirt extending axially forward from the intermediate core parts from between the grooves. Flow control can further be assisted by means of a removable flow-restricting ring mounted on the front core part and projecting into the passage, which ring can be radially displaceable and positionable so that the flow cross section of the extrusion passage can be adjusted.

Another such a flow-restricting body in the feed passage at the location of the groove closest to the front housing end can be displaced to adjust the flow restriction created thereby. This displacement can be effected by a differentially threaded element connected to the body and actuatable from outside the assembly.

DESCRIPTION OF THE DRAWING

The above and other features and advantages will become more readily apparent from the following, reference being made to the accompanying drawing in which.

SPECIFIC DESCRIPTION

Figure 1:
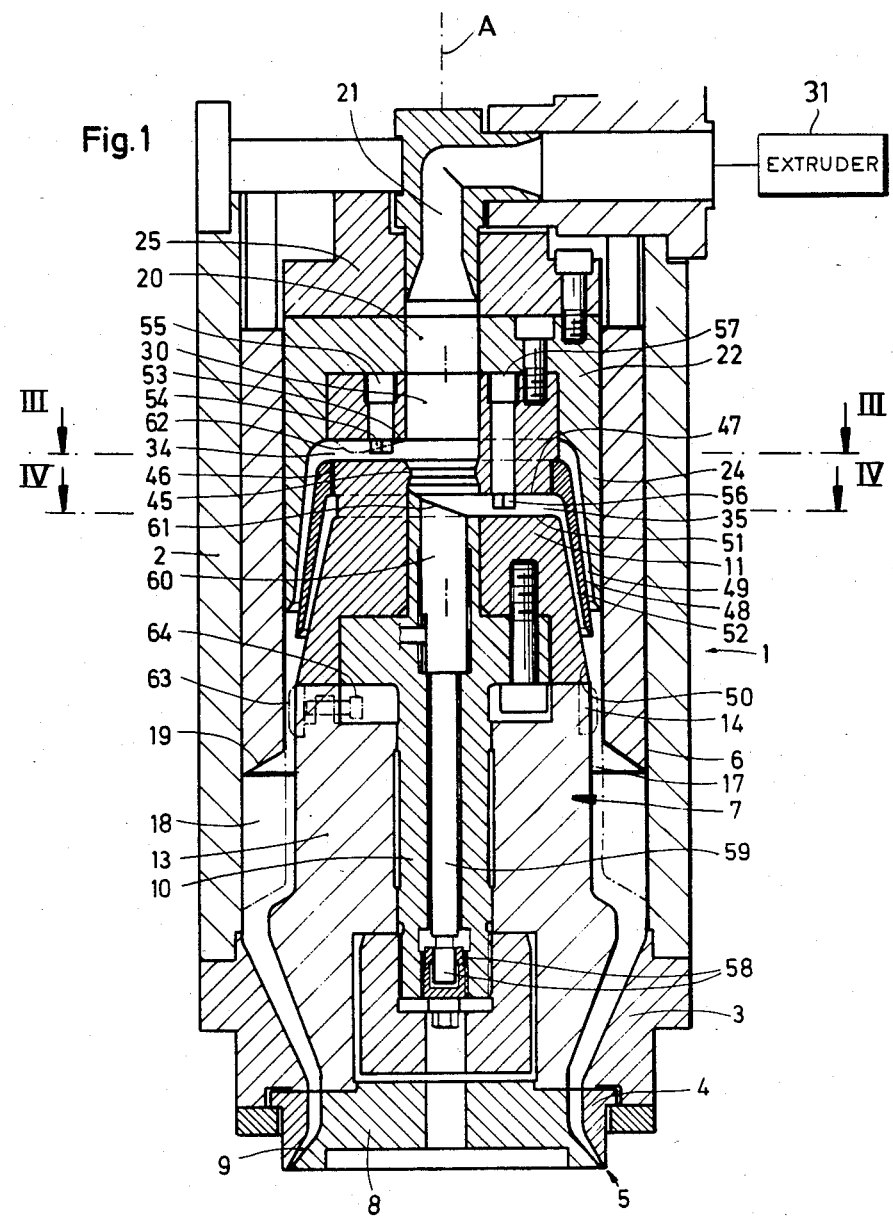
FIG. 1 is an axial section through the nozzle assembly according to this invention.

As seen in FIG. 1, a nozzle assembly 1 according to this invention is basically centered on an axis A which is here shown to be vertical but which in reality can have any convenient orientation. A front housing sleeve 2 has a front end 3 provided with a front nozzle ring 4 forming with an inner nozzle ring 8 a nozzle 5 having an annular passage 9 through which, as is known, a thermoplastic synthetic resin such as polyethylene is extruded to form a tube. Within this sleeve 2 is a core 7 that is also centered on the axis A, that carries at its front end the inner ring 8 and that is basically formed of a front core part 13, an intermediate core part 11, and rear core parts 22 and 25. This core 7 forms with the cylindrical inner surface of the sleeve 2 an annular feed passage 17 and a larger annular storage compartment or reservoir 18 in which a piston 6 can be reciprocated axially as is known in the art. This piston 6 has a frustoconical end face 19 that serves for batch-wise ejection of mass from the nozzle opening or passage 9.

An extruder 31 is connected to a fitting 21 on the rearmost core part 25 so that it can force a plastified synthetic resin to an axially centered feed passage 20 in the rear housing part 22 aligned with an identical feed passage 30 formed in and extending axially through the intermediate part 11. The front portion of this passage 30 is blocked by an element 10 that extends between and interconnects the intermediate and front parts 11 and 13.

Figure 2:
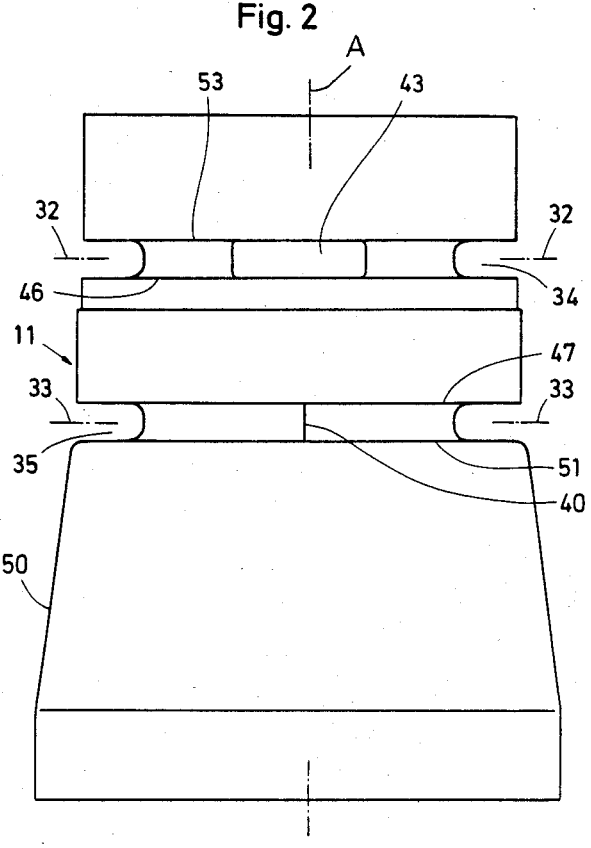
FIG. 2 is a side view of a part of the of the assembly of FIG. 1.
Figure 3:
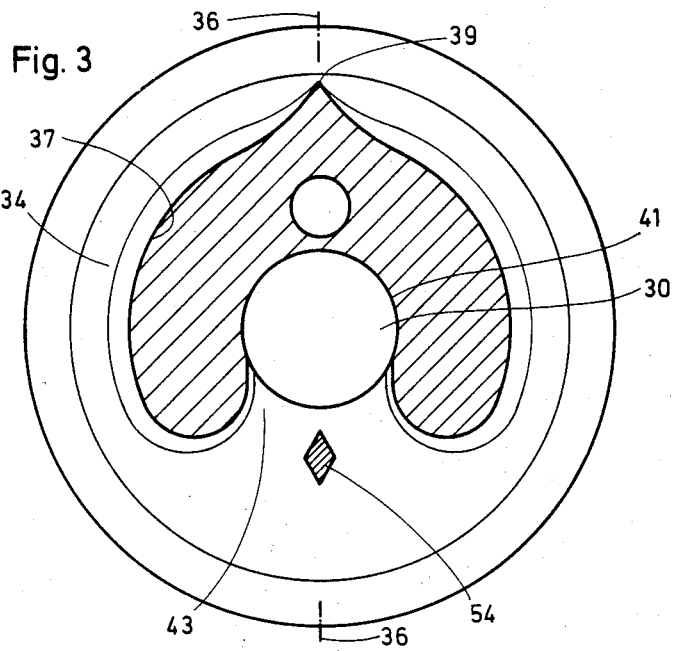
FIGS. 3 and 4 are sections taken along respective lines III—III and IV—IV of FIG. 1.
Figure 4:
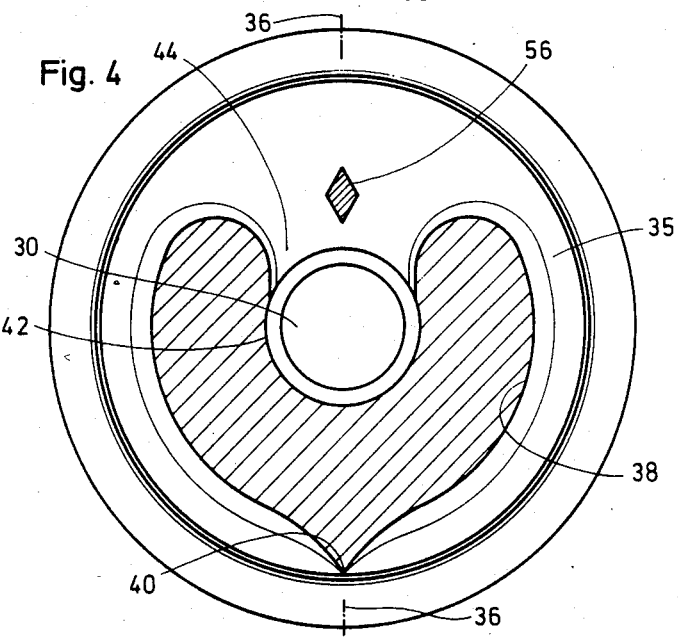

As also shown in FIGS. 2, 3, and 4, the intermediate core part 11 is formed with a pair of axially spaced grooves 34 and 35 centered on respective planes 32 and 33 that are perpendicular to the axis A. These grooves 34 and 35 have annular and planar rear faces 53 and 47 and confronting and identical front faces 46 and 51 bridged by respective heart-shaped surfaces 37 and 38 (FIGS. 3 and 4) which form respective diametrally oppositely directed points 39 and 40. The passage 30 has its deepest portions 41 and 42 at these grooves 34 and 35 that open radially at ports 43 and 44 into the feed passage 30. In addition the passage 30 is formed between the two passage portions 41 and 42 with a restriction 45. Thus the resin that is forced into the fitting 21 by the extruder 31 will pass axially down the feed passages 20 and 30 and will exit radially via the ports 43 and 44 into the grooves 34 and 35 and then spread out tangentially and angularly therein.

Projecting axially downward from the upper faces 53 and 47 in front of the respective ports 43 and 44 are respective rhombus-section flow-dividing and -directing bodies 54 and 56 whose rear ends are formed as externally adjustable screw-type heads 55 and 57. Each of these bodies 54 and 56 terminates short of the respective front face 46 and 51 so that flow past it is not completely divided.

Axially displaceable inside the connector part 10 is a piston 60 having an angled rear face 61 that forwardly closes the end of the passage 30 at the port 44. This piston 60 has a forwardly extending adjustment rod 59 that terminates in a differential screwthread device 58 that can be operated from the front of the assembly 1. Thus it is possible to control flow from the passage 30 into the groove 35 by means of this piston 60. Since the entire flow from the extruder 31 goes to the two grooves 34 and 35, restricting flow into the one groove 35 allows the flow to be balanced between the two very accurately.

The rear core part 22 is further provided with a forwardly flaring frustoconical skirt 24 forming a forwardly flaring passage extension that opens at the rear upstream end into the groove 34 and at the front end into the storage compartment 18. Similarly the intermediate core part is formed with or fitted with a similar such skirt 48 forming with the forwardly flared front surface 50 of this part 11 a passage extension 52 that opens into the compartment 18 slightly axially ahead of the passage extension 49.

For further flow control the front end of the part 11 and rear end of the part 13 can be provided with a fixed flow-restricting ring 14. It is also possible to provide a ring 63 that is radially adjustable by means of a screw 64. Further flow-restricting and -controlling bodies 62 can be provided in the grooves 34 and 35 radially outside the ports 43 and 44.

Figure 5:
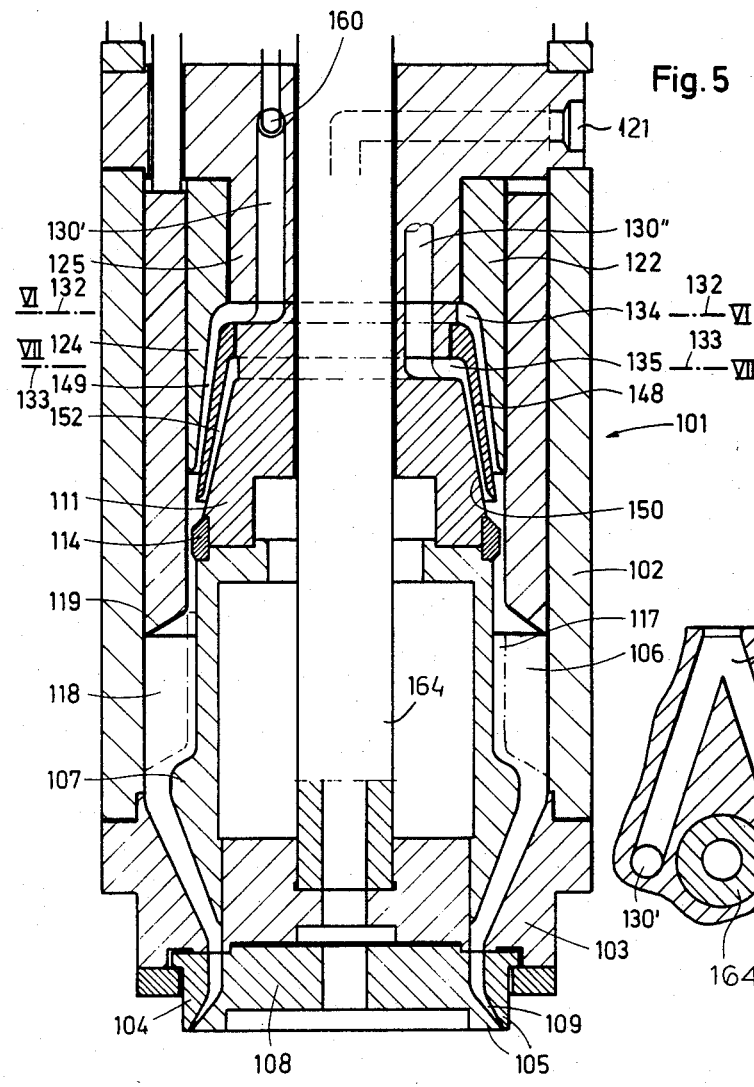
FIG. 5 is a section like FIG. 1 through another assembly in accordance with this invention.
Figure 5A:
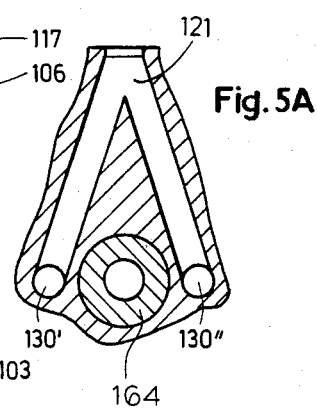
FIG. 5A is a detail of FIG. 5 taken in section along line VA—VA thereof.
Figure 6:
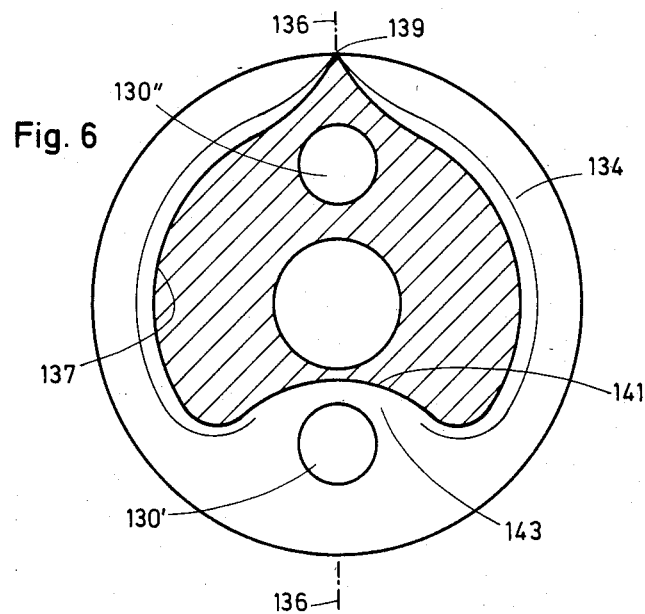
FIGS. 6 and 7 are sections taken along respective lines VI—VI and VII—VII through the intermediate core part of FIG. 5.
Figure 7:
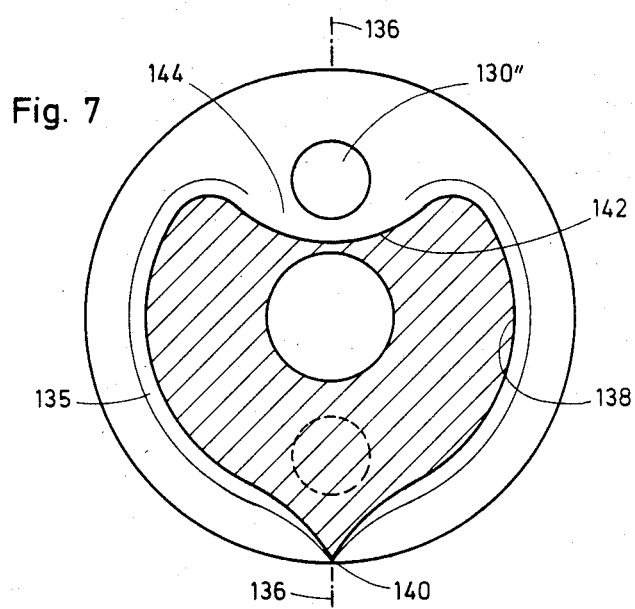

FIGS. 5, 5A, and 6 show an arrangement functionally and structurally very similar to that of FIGS. 1 through 4. The same reference numerals as in FIGS. 1 through 4 are used in FIGS. 5, 5A, and 6, but increased by 100.

In this arrangement two separate feed passages 130' and 130" branch off a single main-feed passage 121, and respective adjustable flow-restricting elements 160 are provided in each of the branch passages 130' and 130". The passages 130' and 130" empty axially directly into the respective heart-shaped grooves 134 and 135 at the locations 143 and 144.

With this system the flow is divided into two nearly complete annular flows. The thin spot formed by the point 139 or 140 is directly aligned with a thick part formed at the opposite deep portion 143 or 144, so that a tube of excellent strength will result. Uniting two such flows like this has the further benefit of reducing the likelihood that any imperfection in either of the flows is reflected in the resultant product, since any such imperfection, such as a bubble, will only represent part of the thickness of the finished product. Since the flow paths do not vary greatly, the product will be highly uniform, and since the grooves are angularly equispaced the average plasticity and so on at any location will average out to the same.

I claim:

1. A nozzle assembly for extruding a tube, the assembly comprising:
   an outer housing sleeve having an inner surface centered on an axis and having an axially forwardly directed front end;
   a front core part within the sleeve at the front end thereof and forming with the inner housing surface an annular axially forwardly open extrusion passage;
   an intermediate core part within the sleeve axially behind and attached to the front core part, the intermediate core part being formed with a pair of radially outwardly open grooves opening into the extrusion passage and each defined by
      a respective annular rear face extending generally perpendicular to the axis,
      a respective annular front face confronting the rear face and extending generally perpendicular to the axis, and
      a heart-shaped annular surface axially bridging the respective faces, facing radially outward, and having a portion forming a radially outwardly directed point, the points being directed generally diametrally oppositely;
   a rear core part within the sleeve axially behind and attached to the intermediate core part and axially rearwardly closing the extrusion passage; and
   means including at least one feed passage in the rear and intermediate core parts for feeding a mass to be extruded under pressure and radially to the grooves at respective locations therein generally diametrally opposite the respective points so that the mass divides in planes generally perpendicular to the axis.

2. The nozzle assembly defined in claim 1 wherein each of the grooves has its region of greatest radial depth at the respective location.

3. The nozzle assembly defined in claim 1, further comprising respective forwardly flared skirts extending axially forward from the core parts from immediately axially behind the rear groove faces and forming flared passage extensions extending from the respective grooves to the extrusion passage.

4. The nozzle assembly defined in claim 1 wherein the feed passage is provided between the grooves with a restriction.

5. The nozzle assembly defined in claim 1 wherein respective separate feed passages extending generally axially open into the grooves at the respective locations.

6. The nozzle assembly defined in claim 5 wherein each of the feed passages is provided with a restriction.

7. The nozzle assembly defined in claim 1 wherein the points are angularly offset.

8. The nozzle assembly defined in claim 1 wherein the groove surfaces are generally symmetrical about respective planes including the axis and bisecting the respective points and locations, the assembly further comprising
   respective flow-directing bodies in the grooves, between the respective faces, at the respective locations, and on the respective symmetry planes.

9. The nozzle assembly defined in claim 8 wherein each of the flow-directing bodies is formed as a blade pivotal about a respective axis parallel to the housing axis.

10. The nozzle assembly defined in claim 9 wherein the bodies are doubly tapered with opposite sharp ends and can be positioned to be bisected by the respective symmetry planes.

11. The nozzle assembly defined in claim 10 wherein each of the bodies projects from one of the respective groove faces and is axially spaced from the other respective groove face.

12. The nozzle assembly defined in claim 1 wherein the feed passage is provided with a flow restriction at least at the locations.

13. The nozzle assembly defined in claim 1, further comprising
   respective flow-restricting bodies each secured to one of the faces of the grooves.

14. The nozzle assembly defined in claim 1, further comprising
   a forwardly flared skirt extending axially forward from the intermediate core parts from between the grooves.

15. The nozzle assembly defined in claim 1, further comprising
   a removable flow-restricting ring mounted on the front core part and projecting into the extrusion passage.

16. The nozzle assembly defined in claim 15 further comprising
   means for radially displacing and positioning the ring, whereby the flow cross section of the extrusion passage can be adjusted.

17. The nozzle assembly defined in claim 1, further comprising
   a flow-restricting body in the feed passage at the location of the groove closest to the front housing end; and
   means for displacing the body and thereby adjusting the flow restriction created thereby.

18. The nozzle assembly defined in claim 17 wherein the displacing means includes a differentially threaded element connected to the body and actuatable from outside the assembly.

* * * * *